United States Patent [19]

Ishizawa et al.

[11] Patent Number: 5,666,338

[45] Date of Patent: Sep. 9, 1997

[54] RECORDING MEDIUM FORMATTED FOR ERROR CORRECTION AND DENSITY RECORDING AND AN APPARATUS FOR RECORDING INFORMATION THEREON AND/OR RECORDING INFORMATION THEREFROM

[75] Inventors: Yoshiyuki Ishizawa; Toshihiko Kaneshige, both of Yokohama, Japan

[73] Assignee: Kabushiki Kaisha Toshiba, Kawasaki, Japan

[21] Appl. No.: 363,320

[22] Filed: Dec. 23, 1994

[30] Foreign Application Priority Data

Mar. 16, 1994 [JP] Japan .................................. 6-046007

[51] Int. Cl.$^6$ ...................................................... G11B 7/00
[52] U.S. Cl. ............................ 369/48; 369/59; 369/275.3
[58] Field of Search ................................... 369/32, 44.26, 369/47–48, 50, 54, 58, 59, 111, 275.3

[56] References Cited

U.S. PATENT DOCUMENTS

| | | |
|---|---|---|
| 4,760,576 | 7/1988 | Sako . |
| 5,359,584 | 10/1994 | Fukushima et al. ................ 369/58 |

FOREIGN PATENT DOCUMENTS

| | | |
|---|---|---|
| 0 258 059 | 3/1988 | European Pat. Off. . |
| 0 305 979 | 3/1989 | European Pat. Off. . |
| 0 507 341 | 10/1992 | European Pat. Off. . |
| A-7-30431 | 1/1995 | Japan . |
| 2 105 152 | 3/1983 | United Kingdom . |

OTHER PUBLICATIONS

Sakamoto, et al, "Signal Processing of the Compact–Cassette Digital Recorder", J. Audio Eng. Soc., vol. 32, No. 9, pp. 647–658, Sep. 1984.

Fujiwara et al, "Essentials of Error–Control Coding Techniques", Academic Press, Inc., 1990, pp. 235–237.

Patent Abstracts of Japan, vol. 8, No. 75 (P–266) Apr. 7, 1984 & JP–A–58–220,211.

*Primary Examiner*—W. R. Young
*Attorney, Agent, or Firm*—Cushman, Darby & Cushman IP Group of Pillsbury Madison & Sutro LLP

[57] ABSTRACT

A recording medium, a signal recording apparatus thereof, and a signal reproducing apparatus thereof, the recording medium having a recording area divided into sectors, each of which is composed of a plurality of frames with a predetermined bit length, wherein at least one of the frames contains a first synchronous pattern representing the length of the frame, a second synchronous pattern composed of a predetermined signal pattern that is not present in a signal pattern of user data and representing the period of the sector, identification data disposed at a predetermined position corresponding to the second synchronous pattern and identifying the sector, and error detection data for detecting an error of the identification data, and wherein each of the other frames contains the first synchronous pattern, the user data, and at least predetermined fixed data with which the second synchronous pattern is substituted and that is present in a signal pattern of the user data, the identification data, the error detection data, and error correction data for correcting an error of the user data.

3 Claims, 6 Drawing Sheets

FIG. 2

| Dn | Tn | CONDITION BY Dn+1 |
|---|---|---|
| 0 | 010000000 | |
| 1 | 001000000 | |
| 2 | 000100000 | |
| 3 | 000010000 | |
| 4 | 000001000 | |
| 5 | 000000100 | OTHER THAN (6. 7. 8. D. AND F) |
| 5 | 000010001 | (6. 7. 8. D. F) case (1) |
| 6 | 100010000 | |
| 7 | 100001000 | |
| 8 | 100000100 | OTHER THAN (6. 7. 8. D. AND F) |
| 8 | 100000001 | (6. 7. 8. D. F) case (1) |
| 9 | 010001000 | |
| A | 010000100 | OTHER THAN (6. 7. 8. D. AND F) |
| A | 010000001 | (6. 7. 8. D. F) case (1) |
| B | 001000100 | OTHER THAN (6. 7. 8. D. AND F) |
| B | 001000001 | (6. 7. 8. D. F) case (1) |
| C | 001000010 | OTHER THAN (0. 6. 7. 8. 9. A. D. F. AND DCC) |
| C | 000100001 | (6. 7. 8. D. F) case (1) |
| C | | DCC (INV) |
| C | 000000001 | (0. 9. A) case (2) |
| C | | DCC (INV) |
| D | 100000010 | OTHER THAN (0. 6. 7. 8. 9. A. D. F. AND DCC) |
| D | 100010001 | (6. 7. 8. D. F) case (1) |
| D | | DCC (INV) |
| D | 010000010 | (0. 9. A) case (2) |
| D | | DCC (INV) |
| E | 000100010 | OTHER THAN (0. 6. 7. 8. 9. A. D. AND F) |
| E | | DCC (INV) |
| E | 000000010 | (6. 7. 8. D. F) case (1) |
| E | | DCC (INV) |
| E | 000000000 | (0. 9. A) case (3) |
| F | 100000000 | |

| DCC | 000001000 | INV |
|---|---|---|
| | 010001000 | non INV |

Case (1)

| Dn+1 | Tn+1 | Dn+2 | Tn+1 |
|---|---|---|---|
| 6 | 000000000 | F | 100000000 |
| | | 0 | 010000000 |
| | | 1 | 001000000 |
| | | 2 | 000100000 |
| | | 3 | 000010000 |
| | | 4 | 000001000 |
| | | 6 | 100010000 |
| | | 7 | 100001000 |
| | | 9 | 010001000 |
| | | DCC | 0$0001000 |
| | 000100010 | B | 001000000 |
| | | C | 000100000 |
| | | D | 000010000 |
| | | E | 000001000 |
| | 000010001 | 5 | 000100000 |
| | | 8 | 000010000 |
| | | A | 000001000 |
| 7 | 000000100 | 0 | 010000000 |
| | | 1 | 001000000 |
| | | 2 | 000100000 |
| | | 3 | 000010000 |
| | | 4 | 000001000 |
| | | 9 | 010001000 |
| | 000000010 | DCC | 0$0001000 |
| | | B | 001000000 |
| | | C | 000100000 |
| | | D | 000010000 |
| | | E | 000001000 |
| | 000000001 | 5 | 000100000 |
| | | 8 | 000010000 |
| | | A | 000001000 |
| | 000100001 | 6 | 000010000 |
| | | 7 | 000001000 |
| | | F | 000100000 |
| 8 | 000100000 | ($ : 0 OR 1) | |
| D | 000010000 | | |
| F | 000001000 | | |

Case (2)

| 0 | 000100000 |
|---|---|
| 9 | 000010000 |
| A | 000001000 |

Case (3)

| 0 | 100100000 |
|---|---|
| 9 | 100010000 |
| A | 100001000 |

RECORDING MEDIUM FORMATTED FOR ERROR CORRECTION AND DENSITY RECORDING AND AN APPARATUS FOR RECORDING INFORMATION THEREON AND/OR RECORDING INFORMATION THEREFROM

BACKGROUND OF THE INVENTION

1. Field of the Invention

The present invention relates to a recording medium such as an optical disc, an apparatus for recording a signal thereon, and an apparatus for reproducing a signal therefrom.

2. Description of the Related Art

In an optical recording/reproducing system, a modulation system corresponding to optical characteristics is used so as to improve recording density, signal reproducing stability, and so forth. In addition, a data formatting process, such as grouping data with a predetermined block, is performed so as to prevent a data error due to scratches of a disc or the like from propagating.

FIG. 8 shows a sector format of a conventional rewritable optical disc. As shown in FIG. 8, a sector is composed of a header portion and a data portion. In the data portion, real record data (user data) is recorded.

In the header portion, an SM (Sector Mark) 1, a VFO 2, an AM (Address Mark) 3, and an address information (ID) 4 have been recorded.

The address information (ID) 4 is composed of a track number 9, a sector number 10, and a CRC (Cyclic Redundancy Code) 11.

The CRC 11 is a code that is used to detect data errors of track No. 9 and sector No. 10.

When data is recorded on an optical disc, a desired sector is detected corresponding to the address information 4 of the header portion, which has been pre-formatted. The data is written to the data portion of that sector.

When data is reproduced from the disc, a desired sector is detected corresponding to the address information 4 of the header portion and the data is read from the data portion of that sector.

Thus, when data is recorded and reproduced, a desired sector is physically identified corresponding to the address information 4 of the header portion. Consequently, the correct reading of the address information 4 greatly affects the reliability of the system. To improve the reliability of the system, the address information 4 is repeatedly recorded in the header portion.

In recent years, due to the improvement of image compression technologies, optical discs on which digitized images and sound are recorded along have become common. In the system that reproduces data from such optical discs, namely a digital video disc system, it is important to record a large amount of image data in the limited area of an optical disc. To do that, the necessity for increasing the recording density has been considered.

When a large amount of image data is very densely recorded in the above-mentioned sector format of the rewritable optical disc, many problems occur. In other words, because the address information 4 is repeatedly recorded in the header portion in the above-mentioned fount, the storage of redundant information increases, which presents an obstacle to high density recording. In addition, as the recording density increases, it is predicted that occurrences of data errors increase. However, in such a format, with the address information 4, only an error is detected corresponding to the CRC 11. In other words, in the conventional sector format including the above-described sector format, high density recording cannot be satisfactorily accomplished.

As described above, when the high density recording is performed for a recording medium, such as an optical disc, some countermeasures against an error in the address information, such as sector number, are required.

SUMMARY OF THE INVENTION

The present invention solves the above-described problems. An object of the present invention is to provide a recording medium that allows identification data to be precisely detected while enabling data to be very densely recorded.

Another object of the present invention is to provide a recording apparatus for recording a signal on a recording medium in a sector format that allows an error in the sector identification data to be corrected and the identification data to be precisely detected when data is reproduced.

A further object of the present invention is to provide a reproducing apparatus that allows an error in the sector identification data to be corrected.

A more further object of the present invention is to provide a reproducing apparatus that allows an error in the sector identification data to be corrected and the error to be detected.

A first aspect of the present invention is a recording medium having a recording area divided into sectors, each of which is composed of a plurality of frames with a predetermined bit length, wherein at least one of the frames contains a first synchronous pattern representing the period of the frame, a second synchronous pattern composed of a predetermined signal pattern that is not present in a signal pattern of user data and adapted for representing the period of the sector, identification data disposed at a predetermined position corresponding to the second synchronous pattern and identifying the sector, and error detection data for detecting an error in the identification data, and wherein each of the other frames contains the first synchronous pattern, the user data, and at least predetermined fixed data with which the second synchronous pattern is substituted and that is present in a signal pattern of the user data, the identification data, the error detection data, and error correction data for correcting an error in the user data.

A second aspect of the present invention is a recording apparatus for recording a signal in the sectors of a recording medium, comprising a means for forming an area for a second synchronous pattern in a data sequence composed of at least identification data, error data detection data, and user data and for placing predetermined fixed data in that area instead of the second synchronous pattern, the fixed data being present in a signal pattern of the user data, the identification data identifying the sector, the error data detection data being adapted for detecting an error in the identification data, the second synchronous pattern representing the period of the sector, a means for generating an error correction code for the data sequence in which the fixed data is placed and for adding the error correction code to the data sequence, a means for adding a first synchronous pattern to the data sequence to which the error correction code is added, the first synchronous pattern representing the period of a frame, the sector being composed of frames, each of which has a predetermined bit length, and a means for placing the second synchronous pattern in the fixed data area of the data sequence to which the first synchronous pattern is added so as to generate a signal composed of the sectors to be recorded on the recording medium, the predetermined signal pattern being not present in the signal pattern of the user data.

A third aspect of the present invention is a reproducing apparatus for reproducing a signal from the recording medium according to the first aspect of the present invention.

The reproducing apparatus comprises means for substituting the second synchronous pattern for the predetermined fixed data that is present in a signal pattern of the user data, the second synchronous pattern being adapted for representing the period of the sector in reproducing data that has been read from the recording medium, and means for correcting a data sequence composed of the substituted fixed data, the identification data, the error detection data, and the user data by using the error correction data which has been added into the data sequence.

Further, the reproducing apparatus comprises means for substituting the second synchronous pattern for the predetermined fixed data that is present in a signal pattern of the user data, the second synchronous pattern representing the period of the sector in reproducing data that has been read from the recording medium, means for correcting a data sequence composed of the substituted fixed data, the identification data, the error detection data, and the user data by using the error correction data which has been added into the data sequence, and means for detecting an error in the identification data corresponding to the error detecting data.

As described above, according to the recording medium of the present invention, since an error of sector identification data is corrected, when data is reproduced, the detecting accuracy of identification data can be improved and thereby highly dense recording can be accomplished.

According to the recording apparatus of the present invention, a signal can be recorded on a recording medium in a sector format where an error in the sector identification data is corrected and the detecting accuracy of the identification data is high when data is reproduced. In addition, the second synchronous pattern is substituted for a predetermined signal pattern that is present in a signal pattern of the user data and that is included in the generating and calculating range of the error correction codes so as to suppress the remainder. Thus, sectors can be composed with a multiple of the period of frames.

According to the reproducing apparatus of the present invention, an error of in the sector identification data can be corrected. When necessary, an error in the identification data can be detected corresponding to the error detected data. When an error is to be quickly detected, such as in a search operation, an error in the identification data is detected without the need to perform the error correcting process. Thereafter, the identification data is used for the control process.

These and other objects, features and advantages of the present invention will become more apparent in light of the following detailed description of best mode embodiments thereof, as illustrated in the accompanying drawings.

BRIEF DESCRIPTION OF THE DRAWINGS

FIG. 2 is a schematic diagram showing the construction of a code conversion table corresponding a 4–9 modulation technique;

DESCRIPTION OF THE PREFERRED EMBODIMENTS

Next, with reference to the accompanying drawings, embodiments of the present invention will be described.

Figure 1:
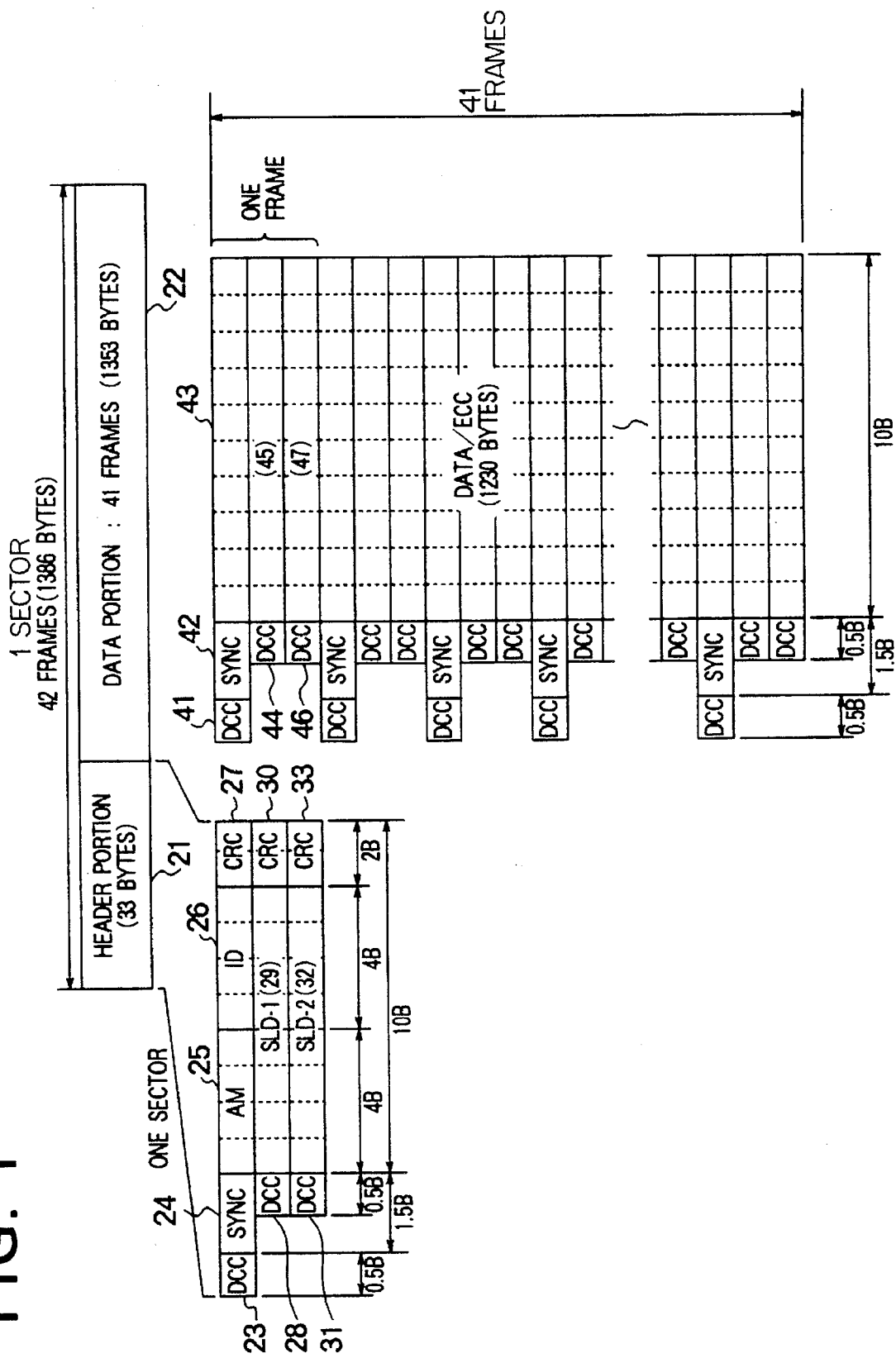
FIG. 1 is a schematic diagram showing a sector format of an optical disc according to an embodiment of the present invention.

FIG. 1 is a schematic diagram showing a sector format of an optical disc according to an embodiment of the present invention.

For the optical disc according to the embodiment, data is encoded corresponding to the 4–9 modulation technique, which is a RLL (Run Length Limited) modulation technique. The 4–9 modulation technique is used to convert 4-bit data into a 9-bit signal pattern.

As shown in FIG. 1, one sector is composed of 42 frames. The first frame of the sector is a header portion 21 that is composed of 33 bytes. The rest (41 frames) of the sector, other than the first frame is a data portion 22 that is composed of 1353 bytes. One optical disc has a plurality of successive sectors.

The portions of header portion 21 include a 2-byte (DCC (23)+SYNC (24)), a 4-byte AM (Address Mark) (25), a 4-byte ID (26), a 2-byte first CRC (27), a 0.5-byte DCC (28), an 8-byte SLD (center Link Data)-1 (29), a 2-byte second CRC (30), a 0.5-byte DCC (31), an 8-byte SLD-2 (32), and a 2-byte third CRC (33). The 2-byte (DCC (23)+SYNC (24)) is a first synchronous pattern. The 4-byte AM (25) is a second synchronous pattern. The 4-byte ID (26) is an address information containing a sector number.

The DCCs (23, 28, 31) are cancel codes that are added so as to suppress DC components of signals that have been converted corresponding to the NRZI technique.

The SYNC (24) is a synchronous code that is used to generate a timing at which data is extracted, byte by byte, when data is demodulated.

The frame synchronous signal, which is composed of the DCC (23) and the SYNC (24), does not correspond to the 4–9 modulation technique. In other words., the frame synchronous signal contains a signal pattern that is not present in the 4–9 modulation code.

AM (25), which is the second synchronous pattern, is data that represents the position of the ID (26) and the delimitation of a sector.

AM (25) is also composed of a signal pattern that is not present in the 4–9 modulation code.

The ID (26) is data that represents a sector number, which is address data.

The first CRC (27) is an error check code for the ID (26).

SLD-1 (29) and SLD-2 (32) are data that represent data types (for example, image signal, character data, and so forth) of the sectors, subordinate relation of sectors, and so forth.

The second CRC (30) is an error check code for the SLD-1 (29).

The third CRC (33) is an error check code for the SLD-2 (32).

Each (data portion 22) of the second to 42nd frames of the sectors is composed of a 2-byte frame synchronous signal (DCC (41)+SYNC (42)), 10-byte user data (43), a 0.5-byte DCC (44), 10-byte user data (45), a 0.5-byte DCC (46), and 10-byte user data (47).

As with the frame synchronous signal of the first frame (header portion 21), the frame synchronous signal (DCC (41)+SYNC (42)) is composed of a signal pattern that is not present in the 4–9 modulation code. The user data (43, 45, 47) contains an ECC (Error Correction Code).

FIG. 2 is a schematic diagram showing the construction of a code conversion table for the 4–9 modulation system. In FIG. 2, $D_n$ is a value of which an input binary data sequence is divided by every four bits and represented in hexadecimal (HEX) notation.

$T_n$ is a binary bit pattern in which the input $D_n$ is converted into 9 bits and at least three "0s" are present between two bit "1s". Due to the relation between $D_n$ and $D_{n+1}$, two or three $T_n$ patterns are provided. Depending on the value of $D_{n+1}$, the pattern of $T_n$ is determined. When $D_n$=5, $T_n$ is either "000000100" or "000010001". When $D_{n+1}$ is 6, 7, 8, D, or F, $T_n$ is "000010001". Otherwise, $T_n$ is "000000100". When $T_n$ is "000000100"., depending on $D_{n+1}$, $D_{n+2}$ also corresponds to the table of case (1). As a practical example, when D is 5, 6, or 7, "000010001", "000000000", or "100001000" can be obtained, respectively.

The minimum code inversion length (Tmin) and the maximum code inversion length (Tmax) in the 4–9 modulation code are 4T and 18T, respectively.

Next, the signal pattern of the frame synchronous signal (DCC+SYNC) in each frame and the signal pattern of the AM (25) in the first frame will be described.

Figure 3:
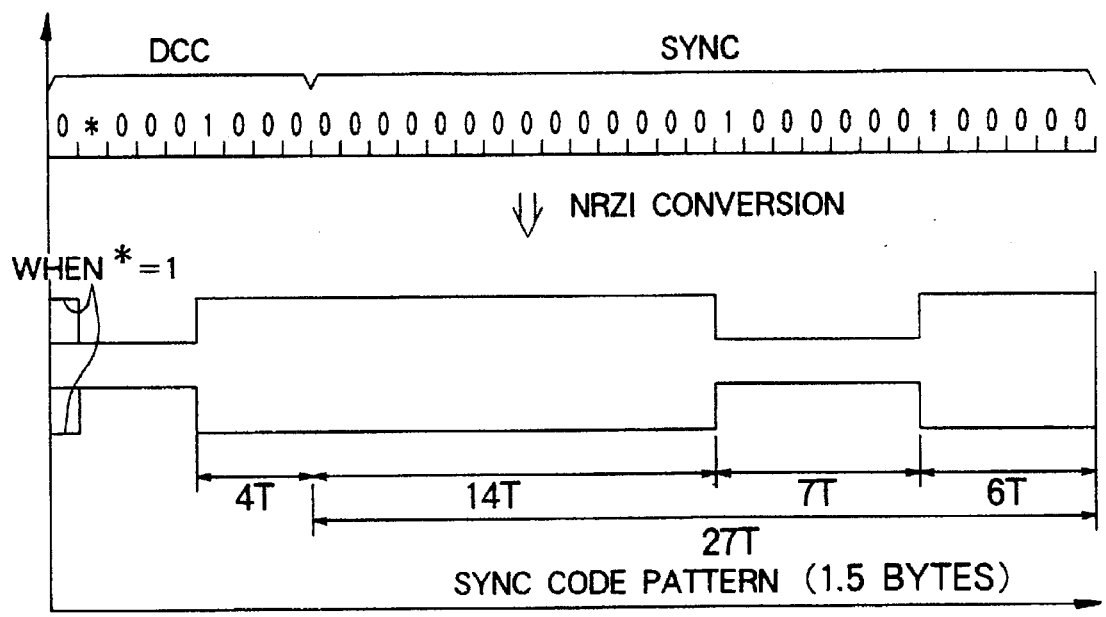
FIG. 3 is a schematic diagram showing the binary data of a frame synchronous signal (DCC+SYNC) and a signal pattern in which the binary data has been converted corresponding to NRZI technique.

FIG. 3 is a schematic diagram showing binary data of the frame synchronous signal (DCC+SYNC) and a signal pattern in which the binary data has been converted corresponding to the NRZI technique.

In FIG. 3, "*" is "1" or "0". The DCC depends on the value of "*". In other words, the 4–9 modulation code of the DCC is "000001000" or "010001000", whichever the value of DSV (Digital Sum Value) is smaller.

When the frame synchronous signal is converted corresponding to the NRZI technique, a signal pattern in which a sequence of the maximum code inversion length (Tmax) for 18T of the 4–9 modulation code is followed by a sequence of a code inversion length for 7T is obtained. The signal pattern in which the maximum code inversion length for 18T is followed by the code inversion length for 7T is not present in the 4–9 modulation code. Thus, the frame synchronous signal is uniquely distinguished from other signal patterns. Consequently, the frame synchronous signal can be easily and accurately detected.

Figure 4:
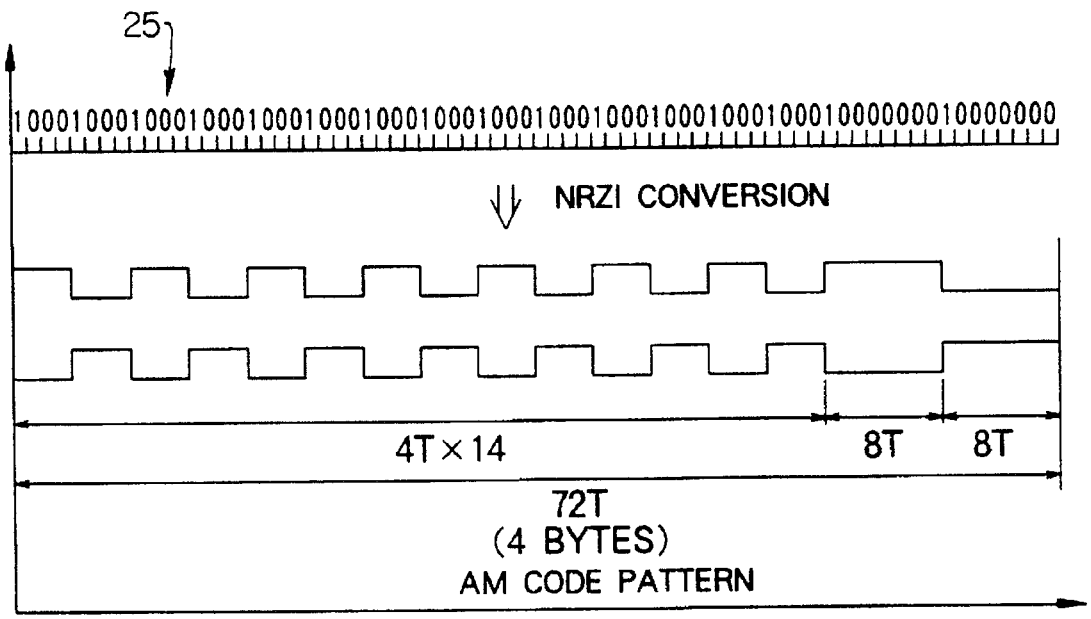
FIG. 4 is a schematic diagrams showing the binary data of AM (25) and a signal pattern in which the binary data has been converted corresponding to the NRZI technique.

FIG. 4 is a schematic diagram showing binary data of the AM (25) and a signal pattern in which the binary data has been converted corresponding to the NRZI technique. When the AM (25) is converted corresponding to the NRZI technique, as shown in FIG. 4, 14 sequences of a code inversion length for 4T are followed by a sequence of a code inversion length for 8T, followed by a code inversion length for 8T or more in which 4T is the minimum code inversion length (Tmin) of the 4–9 modulation code. The signal pattern in which 14 sequences of a code inversion length for 4T take place is not present in the 4–9 modulation code. Since the 4–9 modulation code is not present in the signal pattern that represents AM (25) and the signal pattern contains 14 sequences of a code inversion length for 4T, AM (25) can be uniquely distinguished from other signal patterns and thereby easily and accurately detected.

Figure 5:
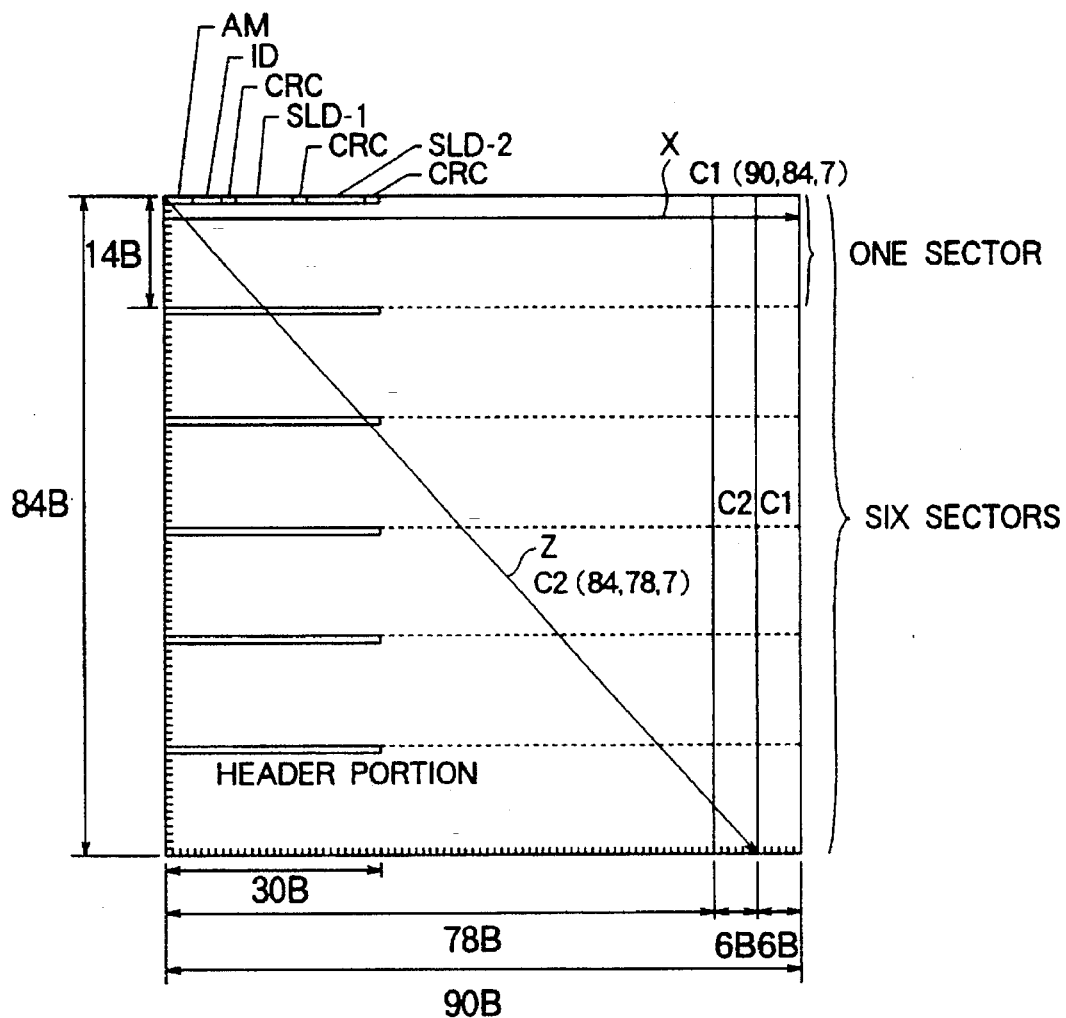
FIG. 5 is a schematic diagram showing the data arrangement in which ECC (error correction code) has been added to user data.

FIG. 5 is a schematic diagram showing a data arrangement in which an ECC (Error Correction Code) has been added to user data. In this example, six sectors compose one ECC group in which there are two error correction codes C1 and C2 as product codes. The error correction code C1 and the error correction code C2 are Reed Solomon codes that are expressed as a primitive polynomial $P(x)=x^8+x^4+x^3+x^2+1$ such as (90, 84, 7) and (84, 78, 7), respectively.

In the two error correction codes, the C1 error correction code is generated and the error correcting process thereof is performed with a row of 90 bytes in the X (horizontal) direction of FIG. 5. On the other hand, the C2 error correction code is generated and the error correcting process thereof is preformed with a sequence of 84 bytes in the Z (diagonal) direction of FIG. 5.

The SYNC and the DCC in the sector format shown in FIG. 1 are not included in the generating and error correcting range of the error correction codes C1 and C2. In other words, AM (25), the ID (26), the first CRC (27), the SLD-1 (29), the second CRC (30), the SLD-2 (32), and the third CRC (33) of the header portion 21 are included in the generating and error correcting range of the generation of the error correction codes C1 and C2.

However, because the AM (25) is composed of a special signal pattern that does not correspond to the modulation rule, it cannot be included in the calculating range of the error correction codes C1 and C2. Thus, before the error correction codes C1 and C2 are generated and calculated on the recording apparatus side, AM (25) is substituted with fixed data corresponding to the modulation rule. Thereafter, the error correction codes C1 and C2 are generated for AM (25).

On the other hand, in the data portion 22, all the user data, other than the DCC and the SYNC, are included in the generating range of the error correction codes C1 and C2 and the error correcting process.

Next, a recording apparatus that records a signal on an optical disc according to an embodiment of the present invention will be described.

Figure 6:
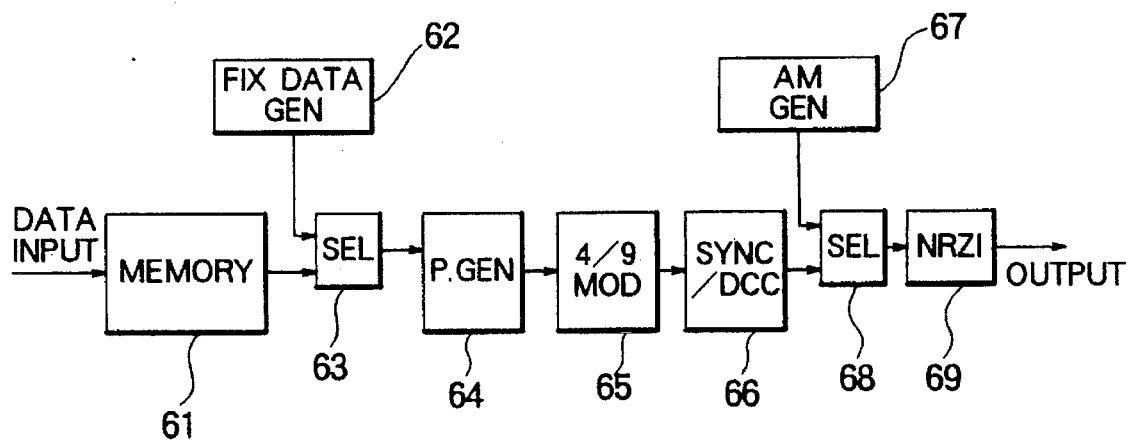
FIG. 6 is a block diagram showing the construction of a recording apparatus according to the present invention.

FIG. 6 is a block diagram showing the construction of the recording apparatus. Referring to FIG. 6, the recording apparatus comprises a memory 61, a fixed data generating circuit 62, a first selecting circuit 63, a parity generating circuit 64, a 4–9 modulating circuit 65, a formatting circuit 66, an AM generating circuit 67, a second selecting circuit 68, and an NRZI modulating circuit 69. Next, the operation of the recording apparatus will be described.

Data to be recorded on an optical disc is stored in the memory 61. The data stored in the memory 61 is user data such as image data, and sound data, ID, CRC, and SLD. Data is read from the memory 61 corresponding to the error correction codes C1 and C2 of the parity generating circuit 64. The data is supplied to the parity generating circuit 64 through the first selecting circuit 63. At this point, for the AM data area, the first selecting circuit 63 selects 4-byte fixed data (such as "00", "00", "00", "00") from the fixed data generating circuit 62 and supplies the fixed data to the parity generating circuit 64.

The parity generating circuit 64 calculates the error correction codes C1 and C2, adds them to the record data, and supplies the resultant data to the 4-9 modulating circuit 65.

The 4-9 modulating circuit 65 converts the input data sequence into a 4-9 modulation code and supplies the 4-9 modulation code to the formatting circuit 66.

The formatting circuit 66 adds a predetermined signal pattern of the SYNC and the DCC to a data sequence of the 4-9 modulated data so as to form sector data composed of sectors.

Thereafter, the formatting circuit 66 supplies the sector data to the NRZI modulating circuit 69. The NRZI modulating circuit 69 performs the NRZI modulation for the sector data. At this point, for the AM data area, the second selecting circuit 68 selects the predetermined signal pattern shown in FIG. 4 from the AM generating circuit 67 and supplies the signal pattern to the NRZI modulating circuit 69. Thereafter, a record processing portion (not shown) records the NRZI-modulated sector data on the optical disc.

As described above, according to the embodiment, since AM (25) is substituted with fixed data and included in the generating and calculating range of the error correction codes, sectors with a multiple of periods of frames can be composed. In addition, since the fixed data of the AM is restored to the original signal pattern of the AM just before the NRZI-modulation has been performed, the function of the AM can be securely performed.

Next, a reproducing apparatus that reproduces a signal from the optical disc on which the signal has been recorded in the above-described manner will be described.

Figure 7:
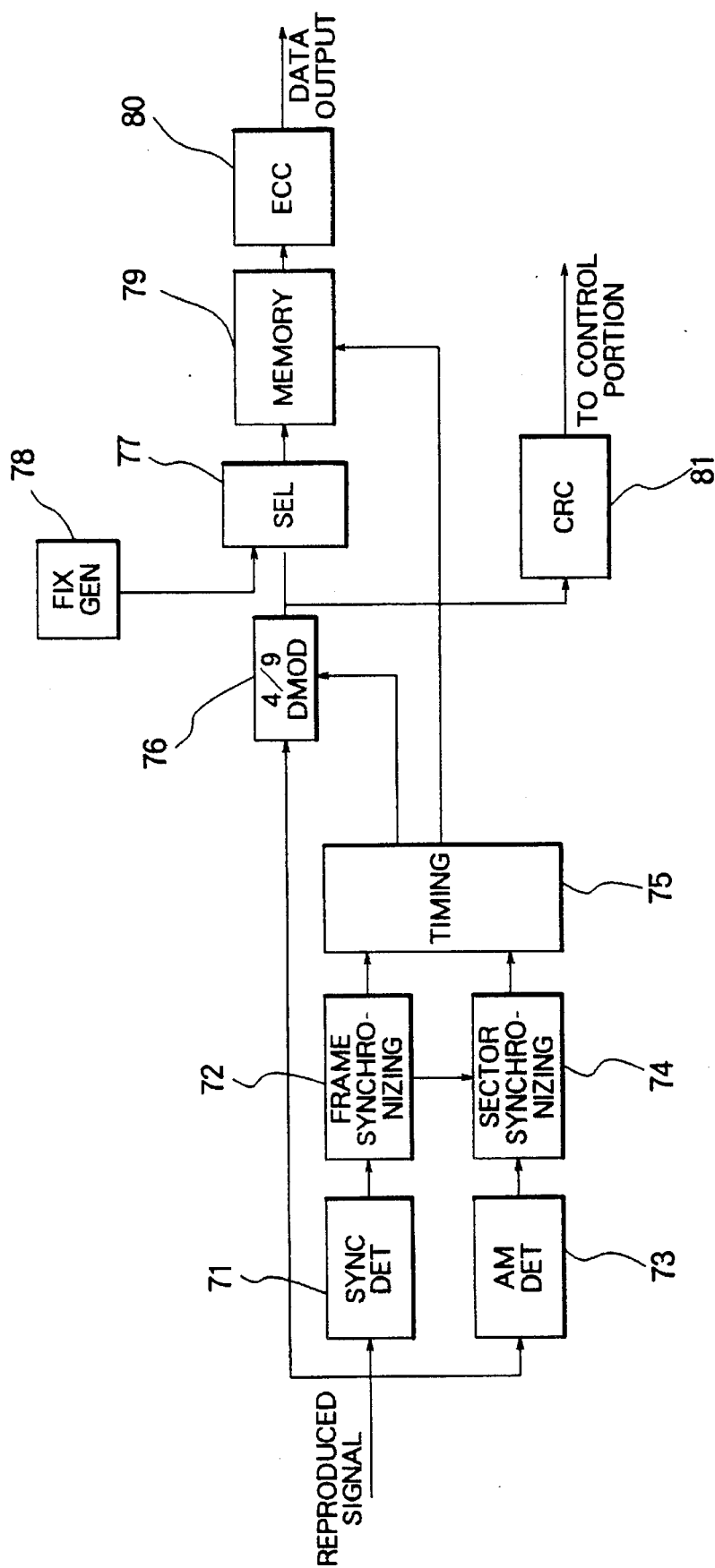
FIG. 7 is a block diagram showing the construction of a reproducing apparatus according to the present invention.
Figure 8:
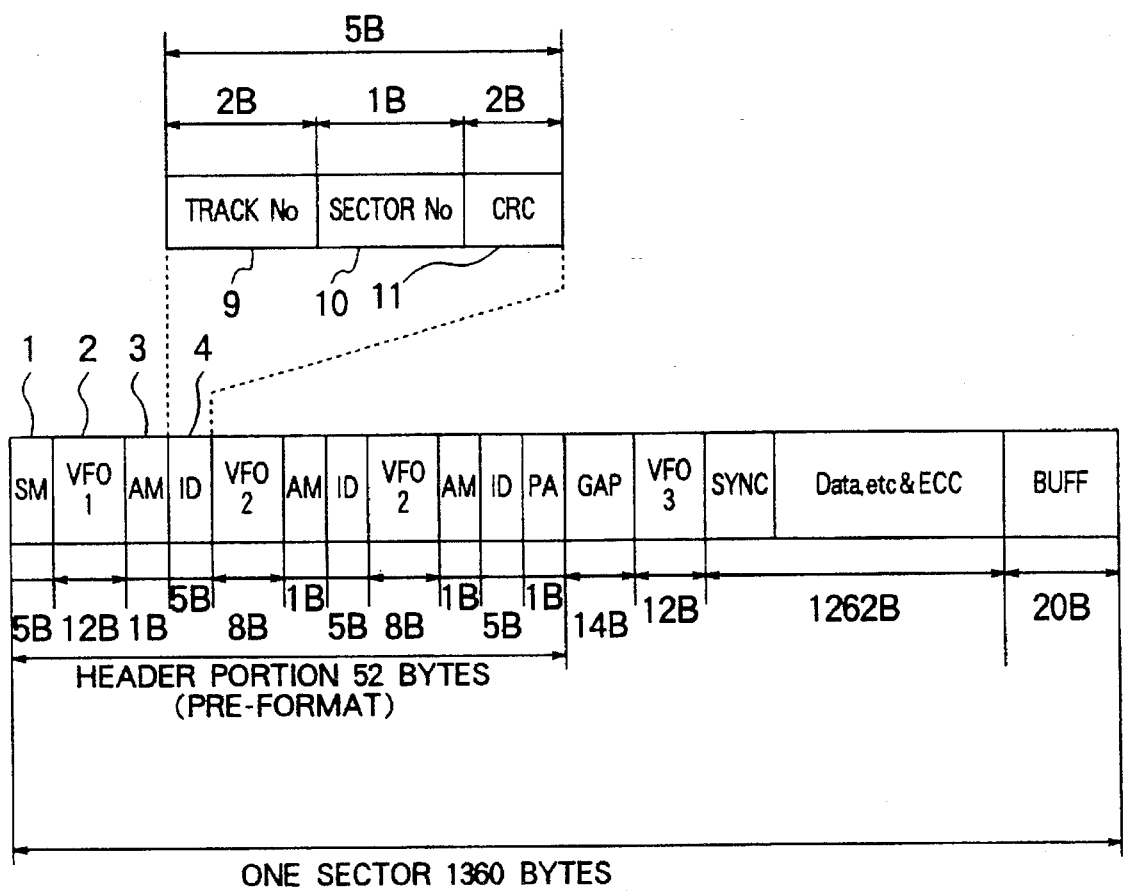
FIG. 8 is a schematic diagram showing a sector format of a conventional rewritable optical disc.

FIG. 7 is a block diagram showing the construction of the reproducing apparatus.

Referring to FIG. 7, the reproducing apparatus comprises a SYNC detecting circuit 71, a frame synchronizing circuit 72, an AM detecting circuit 73, a sector synchronizing circuit 74, a timing circuit 75, a 4-9 demodulating circuit 76, a selecting circuit 77, a fixed data generating circuit 78, a memory 79, an error correcting circuit 80, and a CRC checking circuit 81.

A reproduction processing portion (not shown) reads a signal from an optical disc and supplies the signal to the SYNC detecting circuit 71 and the AM detecting circuit 73.

The SYNC detecting circuit 71 detects a SYNC pattern from the input disc reproduced signal. Thereafter, the frame synchronous circuit 72 synchronizes with frames corresponding to the SYNC detected signal received from the SYNC detecting circuit 71. At this point, synchronous protection is performed so that out-of-synchronism does not takes place even if a few SYNCs are lost.

On the other hand, the AM detecting circuit 73 extracts an AM pattern whenever 42 SYNCs take place.

The sector synchronizing circuit 74 synchronizes with sectors corresponding to the AM detected signal received from the AM detecting circuit 73. At this point, as with the frame synchronizing circuit 72, the sector synchronizing circuit 74 protects synchronism of sectors so as to prevent out-of-synchronism of sectors from taking place even if the AM pattern is lost.

The timing circuit 75 receives the synchronous signals from the frame synchronizing circuit 72 and the sector synchronizing circuit 74, generates a demodulating timing signal and a write address signal, and supplies the demodulating timing signal to the 4-9 demodulating circuit 76 and the write address signal to the memory 79.

Although the 4-9 demodulated data is supplied to the memory 79, for the AM area, the selecting circuit 77 selects fixed data received from the fixed data generating circuit 78 and supplies the fixed data to the memory 79. The fixed data is the same as the fixed data generated by the fixed data generating circuit 62 of the recording apparatus. In other words, the fixed data is for example "00", "00", "00", "00".

Thereafter, data is read from the memory 79. The data is supplied to the error correcting circuit 80 that performs an error correcting process. The error correcting circuit 80 corrects errors of ID (26), CRC (27), SLD-1 (29), CRC (30), SLD-2 (32), and CRC (33) of the header portion 21 as well as the user data. Even if an error takes place in these portions, when it is in the error correctable range, it can be corrected to correct data.

In the reproducing apparatus, when necessary, the 4-9 modulated data is supplied to the CRC checking circuit 81 that detects errors of ID (26), SLD-1 (29), and SLD-2 (32) of the header portion 21 without the need to perform the error correcting process. The detected result of the CRC checking circuit 81 is supplied to a control circuit. The control circuit performs a predetermined control process corresponding to a situation.

For example, to precisely detect and correct an error as in the conventional reproducing operation, the error correcting process is preformed. To quickly detect and correct an error as in the search operation or the like, the CRC checking circuit 81 is activated so as to detect an error of the header portion 21 and perform control process for the header portion 21.

As described above, according to the recording medium of the present invention, because an error in the sector identification data is corrected, when data is reproduced, the detecting accuracy of the identification data can be improved and thereby very dense recording can be accomplished.

According to the recording apparatus of the present invention, a signal can be recorded on a recording medium in a sector format where an error of sector identification data is corrected and the detecting accuracy of the identification data is high when data is reproduced. In addition, the second synchronous pattern is substituted with a predetermined signal pattern that is present in a signal pattern of user data and that is included in the generating and calculating range of the error correction codes so as to suppress the remainder. Thus, sectors can be composed with a multiple of the period of frames.

According to the reproducing apparatus of the present invention, an error in the sector identification data can be corrected. When necessary, an error of the identification data can be detected corresponding to the error detected data. When an error is to be quickly detected, such as in a search operation, an error in the identification data is detected without the need to perform the error correcting process. Thereafter, the identification data is used for the control process.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A recording medium comprising:

a recording area divided into sectors, each of which is composed of a plurality of frames with a predetermined bit length, at least one of the plurality of frames in an associated sector comprising:
- a first synchronous pattern representing the period of the frame,
- a second synchronous pattern composed of a predetermined signal pattern that is not present in a signal pattern of user data and representing a period of the associated sector,
- identification data disposed at a predetermined position corresponding to the second synchronous pattern for identifying the associated sector, and
- error detection data for detecting an error in the identification data; and the other frames in the associated sector comprising:
- the first synchronous pattern,
- the user data,
- predetermined fixed data with which the second synchronous pattern is substituted and that is present in a signal pattern of the user data,
- the identification data,
- the error detection data, and
- error correction data for correcting an error in the user data.

2. A reproducing apparatus for reproducing a signal from a recording medium having a recording area divided into sectors, each of which is composed of a plurality of frames with a predetermined bit length, wherein at least one of the plurality of frames in an associated sector contains a first synchronous pattern representing the period of the frame, a second synchronous pattern composed of a predetermined signal pattern that is not present in a signal pattern of user data and representing a period of the associated sector, identification data disposed at a predetermined position corresponding to the second synchronous pattern for identifying the associated sector, and error detection data for detecting an error in the identification data, and wherein the other frames in the associated sector contains the first synchronous pattern, the user data, predetermined fixed data with which the second synchronous pattern is substituted and that is present in a signal pattern of the user data, the identification data, the error detection data, and error correction data for correcting an error in the user data, the reproducing apparatus comprising:

means for substituting the second synchronous pattern for the predetermined fixed data that is present in a signal pattern of the user data, the second synchronous pattern representing the period of the associated sector in reproducing data that has been read from the recording medium, and means for correcting a data sequence composed of the substituted fixed data, the identification data, the error detection data.

3. The reproducing apparatus as set forth in claim 2, further comprising means for detecting an error in the identification data corresponding to the error detection data.

* * * * *

UNITED STATES PATENT AND TRADEMARK OFFICE
CERTIFICATE OF CORRECTION

PATENT NO. : 5,666,338
DATED : September 9, 1997
INVENTOR(S) : Ishizawa et al.

It is certified that error appears in the above-indentified patent and that said Letters Patent is hereby corrected as shown below:

On the title page, and in column 1, line 5,
item [54] RECORDING MEDIUM FORMATTED FOR ERROR CORRECTION AND HIGH DENSITY RECORDING AND AN APPARATUS FOR RECORDING INFORMATION THEREON AND/OR REPRODUCING INFORMATION THEREFROM Column 1, line 2, after "AND", insert --HIGH--;

line 5, change "RECORDING" to --REPRODUCING--;

line 64, change "fount" to --format--.

Column 2, line 37, delete "adapted for".

Column 3, line 66, after "corresponding", insert --to--.

Column 4, line 36, after "frame", insert a comma --,--.

Column 8, line 54, change "of" to --in--.

Signed and Sealed this

Twenty-first Day of July, 1998

Attest:

BRUCE LEHMAN

*Attesting Officer*   *Commissioner of Patents and Trademarks*